United States Patent Office 3,782,985
Patented Jan. 1, 1974

3,782,985
LIGHTWEIGHT, HIGH STRENGTH CONCRETE AND METHOD FOR MANUFACTURING THE SAME
John C. Gebhardt, Annapolis, Md., assignor to Cadcom, Incorporated, Annapolis, Md.
No Drawing. Filed Nov. 26, 1971, Ser. No. 202,601
Int. Cl. C04b 7/02, 7/32; C08h 17/04
U.S. Cl. 106—97
10 Claims

ABSTRACT OF THE DISCLOSURE

A lightweight, high strength concrete is formed by mixing with water, an admixture of fine aggregate consisting solely of coal fly ash cenospheres and dry hydraulic cement, then solidifying the mixture.

BACKGROUND OF THE INVENTION

Field of the invention

This invention relates to lightweight, high strength concrete and more particularly to such improved concrete having particular application to the construction, oil and marine industries.

Description of the prior art

Mesh reinforced concrete is in general use in the construction industry, but even with the reinforcement of the mesh, conventional hydraulic cement has relatively poor strength to weight ratio. Further, water seeps through ordinary concrete when under pressure and due to capillary forces. While dense, well-constructed, well-cured concrete ordinarily does not leak, capillary forces will cause some dampness to occur on the wall of the concrete structure over an extended period of time. Ordinary concrete exhibits somewhat greater porosity to the lighter and more volatile oils such as kerosene, benzene, naptha and gasoline. And thus, the porosity of ordinary concrete makes conventional concrete unsuitable for storage tanks unless special linings are applied to the inside of these tanks.

Further, ordinary concrete acts to some extent as a thermal insulator but is not normally considered an insulating structural material. The lack of ability of conventional concrete to withstand high temperatures without degrading, makes most conventional concrete useless in application requiring the concrete to be subject to high temperatures for extensive periods of time. Attempts have been made to form a lightweight, high strength structural concrete material by employing coal fly ash both as a portion of the aggregate of the concrete admixture, and also by replacing entirely, the fine aggregate of conventional concrete materials. As a rule, concrete utilizing fly ash as the sole aggregate, is slightly lighter in weight than normal concrete and of comparable strength. Cement blocks have also been made from fly ash and portland cement. Fly ash has been used in the past, together with calcium hydrate, to create a structural material and fly ash combined with shale or clay has been fired in a non-oxidizing atmosphere to produce lightweight aggregates for further use in concrete. In all of these applications, the fly ash is employed essentially as it is obtained from the precipitators.

Coal fly ash is a by-product of the combustion of pulverized coal. It is normally collected from the flue gases in an electrostatic precipitator and disposed of as waste material.

No grading or enhancement of the properties of fly ash has been attempted, except for compacting, firing or sintering, and the resulting structural products produced using coal fly ash as a component have in the past exhibited few unusual properties. However, it is known that a small fraction of coal fly ash consists of small, hollow spheres, called cenospheres, or "floaters." It is further known that the floaters or cenospheres typically constitute from 0.5 to 5% of the weight of the ash.

SUMMARY OF THE INVENTION

The present invention is directed to the employment of fly ash cenospheres as sole aggregate in an admixture of aggregate and dry hydraulic cement to form an improved lightweight, high strength concrete material. Preferably, the cement in the admixture varies from .2 to 4.0 parts for each part cenospheres by volume. The hydraulic cement may comprise portland cement or high-alumina cement and, after separating the cenospheres from the coal fly ash, the fly ash cenospheres are mixed with the dry hydraulic cement to the extent necessary to prevent stratification of the light cenospheres in the heavier cement. Water is added to this admixture and mixed with the same until workability of the mixture is achieved, and the mixture is then cast into the product form desired and hardened. Preferably, the ratio of water to cement varies from .36 to 1.5 by volume.

DESCRIPTION OF PREFERRED EMBODIMENT

The present invention is directed to a lightweight, high strength, structural concrete material and its method of production which is formed of mineral cement and the light, hollow spherical particles known as cenospheres or floaters, which are found in coal fly ash. Raw fly ash collected as a by-product of the combustion of pulverized coal by an electrostatic precipitator or the like is in the form of a very fine powder and amounts to about 10% by weight of the coal which is burned. A typical raw fly ash generated from a bituminous coal has the chemical composition of the following table:

TABLE 1

| Component: | Percent by weight |
|---|---|
| $SiO_2$ | 49.1 |
| $Al_2O_3$ | 16.25 |
| $Fe_2O_3$ | 22.31 |
| CaO | 4.48 |
| MgO | 1.00 |
| $Na_2O$, $K_2O$ | 1.47 |
| C | 2.21 |

90% by weight of the particles in raw, carbon-free fly ash are less than $50\mu$ in diameter. The average specific surface of fly ash is 3,600 (cm.$^2$/g.) and the average density of the individual particles is 2.4 g./cm.$^3$.

The fraction of coal fly ash in the form of cenospheres typically ranges from 0.5 to 5% of the weight of the fly ash. In contrast to raw fly ash, cenospheres have a bulk density of from 0.25 to 0.35 g./cm.$^3$, and individual cenospheres have density varying from 0.4 to 0.6 g./cm.$^3$. The cenospheres are larger than the solid fly ash particles and range in diameter from about $50\mu$ to $125\mu$. Studies have shown an investigation of the chemical composition of the cenospheres in contrast to the raw fly ash shows that the chemical composition varies from sample to sample but is significantly different from the composition of raw fly ash. A typical composition being set forth in Table 2:

TABLE 2

| Component: | Percent by weight |
|---|---|
| $SiO_2$ | 55–61 |
| $Al_2O_3$ | 26–30 |
| $Fe_2O_3$ | 4–10 |
| CaO | 0.2–0.6 |
| MgO | 1–2 |
| $Na_2O$, $K_2O$ | 0.5–4.0 |
| Carbon | 0.01–2.0 |

It is noted that by comparing the compositions of the raw fly ash with the composition of cenospheres forming a minor portion thereof, the latter have considerably more silica ($SiO_2$) and about twice as much alumina ($Al_2O_3$) as raw fly ash. Also, cenospheres contain about five times less iron oxide ($Fe_2O_3$) and lime (CaO) than raw fly ash. It has been ascertained that the chemical composition of cenospheres particularly due to their size and structure, make them ideal as a constituent of structural concrete and that the combination of cement, cenospheres and water in proper proportions, yields a workable plastic mass which hardens into a new and different structural material, with properties superior to either conventional concrete, fly ash concrete, or other structural materials made from fly ash. It is to this end that the present invention is directed.

The improved concrete material of the present invention is formed by separating cenospheres from the raw fly ash and admixing the same with dry hydraulic cement in amounts varying from .2 part to 4 parts cenospheres to one part hydraulic cement, by volume. Water is added in sufficient quantity to give the resulting plastic mass adequate workability, however the water is not added until the cenospheres and dry portland cement or high alumina cement are thoroughly mixed, since the very light cenospheres tend to stratify in the heavier portland cement. It is further noted that significantly more water is required to achieve workability of the fluid cement mixture than would be required for conventional mortars or concrete. Reference to Table 1 illustrates the water necessary to achieve workability for various cenosphere concrete compositions, together with the water necessary to achieve the same workability for a typical sand-cement mortar. It has been found that in calculating the required water, it is more appropriate to use the water-total solids ratio instead of the water-cement ratio, since the average particle size of the cenospheres is of the same order of magnitude as the particles of the cement, and hence the surface area per unit volume is nearly the same as for portland cement. It is believed that most of the extra water is needed to lubricate the cenospheres, allowing them to move freely around and among the cement particles. However, some of the extra water is used to chemically hydrate the unreacted lime which, in turn, combines with the alumina and silica in the cenospheres, producing a cementation bond between the aggregate and the cement. It is believed that this is the phenomena which contributes materially to the strength of the cenosphere hydraulic cement concrete material.

In contrast, in concrete with raw fly ash as the fine aggregate, some of the fly ash also reacts with the unreacted lime. However, the average particles size of the raw fly ash is much smaller than the cenospheres and more water is therefore required than is necessary or desirable for optimum strength. The increased surface area of the raw fly ash available for the pozzolonic reaction is not necessary, since only a small amount of unreacted lime is present. By using cenospheres instead of raw fly ash, less water is required (the cenospheres supply some unreacted lime with their own), and sufficient surface areas available to react all of the unreacted lime in the cement and in the cenospheres.

The improved, lightweight, high strength, concrete material of the present invention is also highly impermeable. Extensive testing has revealed that the concrete of the present invention may be formulated to meet many different strength and weight requirements. Depending upon the proportions of cenospheres and cement, the density may vary between 45 and 115 pounds per cubic foot and a compressive strength may in turn vary between 2,000–15,000 p.s.i. Test results in terms of strength, density and strength to weight ratios are illustrated in the following Table 3:

TABLE 3

| Parts | | | Water by volume | Compressive strength, p.s.i. | Density, lbs./ft. | Strength to weight |
|---|---|---|---|---|---|---|
| Cement | Cenospheres | Sand | | | | |
| .2 | 1 | 0 | .300 | 2,000 | 45 | 44 |
| .25 | 1 | 0 | .313 | 2,500 | 53 | 47 |
| .33 | 1 | 0 | .334 | 3,000 | 60 | 50 |
| .5 | 1 | 0 | .375 | 3,300 | 65 | 51 |
| 1.0 | 1 | 0 | .520 | 6,400 | 100 | 64 |
| 2.0 | 1 | 0 | .808 | 9,400 | 103 | 91 |
| 3.0 | 1 | 0 | 1.080 | 12,000 | 109 | 110 |
| 4.0 | 1 | 0 | 1.450 | 15,000 | 114 | 131 |
| 1 | 0 | 0 | .53 | | | |

From the above test results, it is noted that the strength-to-weight ratios obtainable with the concrete of the present invention are, in general, slightly higher for 2000 p.s.i. cenosphere concrete to four times greater than conventional high-strength structural concrete which has a density of 145 lb./cubic feet and a strength of 6000 p.s.i. In contrast, 3000-p.s.i. cenosphere concrete of the present invention weighs only 60 pounds per cubic foot. The modulus of elasticity of the improved concrete material of the present invention is less than that of ordinary concrete. This improved property is due to the elasticity of the hollow cenospheres and is partially responsible for the increased toughness exhibited by the material of the present invention. Further, the tensile strength of the improved concrete material of the present invention increases as the compressive strength increases. The splitting tensile strength as obtained by the testing method described in ASTMC 496 compares favorably with the tensile strength of ordinary concrete.

In terms of thermal properties, it is believed that the improved cenosphere concrete material of the present invention exhibits extraordinarily low thermal conductivity for a high strength structural material, thus making it highly suitable for use as an insulating structural material. It has been determined that the cenospheres in addition to being hollow, are filled primarily with nitrogen and hence materially add to the insulating quality of the concrete mixture. Further, cenosphere concrete of the present invention formulated with high-alumina cement is not only light in weight, but can withstand high temperatures without degrading. Since the cenospheres are highly refractory in themselves, having a melting point of about 3300° F., they do not soften below that temperature. By test, it has been further determined that cenosphere hydraulic cement concrete of the present invention made with high-alumina cement retains its strength up to 1600° F., at which point the cement begins to melt slightly, attaining a fuse bond which increases the strength of the material and makes it usable up to 2300° F. Further, the improved cenosphere-hydraulic cement concrete of the present invention when formed with alumina cement hardens in about 24 hours to a strength approximately equal to the 28-day strength of the equivalent cenosphere concrete mixture made with portland cement. Eventually, when fully cured, it attains twice the strength of the equivalent portland cement concrete mixture.

In comparison with ordinary concrete structures, the porosity of the improved concrete of the present invention is extremely low. Concrete panels employing cenospheres as the total aggregate in hydraulic cement, manufactured under the method previously described, having a thickness of ⅜ of an inch, were subjected to 20-foot-heads of water and kerosene for approximately one week with absolutely no detectable seepage. This result is indicative that the improved concrete mixture of the present invention is significantly different in structure from ordinary concrete and therefore may be highly useful where lightweight, low-porosity materials are desired. The unusual quality of the improved concrete mixture of the present invention would not be readily apparent, since in order for ordinary concrete to the watertight, the lowest possible water/cement ratio must be used, consistent with workability requirements. Since required water/cement ratio for the improved concrete mixture of the present invention is higher than that for ordinary concrete, it would appear that cenosphere concrete would be quite porous and non-watertight. Test results indicate that this is clearly not the case, and the opposite is true.

Further, while the raw materials from the concrete of the present invention is formulated, are more expensive than those raw materials forming ordinary concrete, the total project cost may in fact be reduced in weight sensitive application through reductions of deadloads, transportation costs and handling costs.

From the above, it is readily apparent that the improved hydraulic cement—fine aggregate concrete of the present invention in which the fine aggregate consists solely of fly ash cenospheres, results in a mortar having superior properties in terms of:

(1) High strength—28-day strengths at least as high as those of conventional hydraulic cement concretes;
(2) Low weight—densities on the order of 50% of 1:2 (sand-cement) mortar;
(3) Low porosity—must be watertight; and
(4) Other properties which must equal or exceed those of sand-cement mortar.

The concrete material of the present invention constitutes the ideal hydraulic mortar for use in any concrete product where weight is a factor. Advantageously, such material may form the floor slabs for high rise buildings, concrete pipe, all types of marine uses and particularly ship holds, factory-built modular housing units and precast concrete products which must be transported long distances and are subject to large handling costs, due to their weight to volume ratios.

What is claimed is:

1. In a concrete material consisting of an admixture of fine aggregate and dry hydraulic cement, and formed by mixing with water and subsequently hardening of the same, the improvement wherein said fine aggregate solely comprises fly ash cenospheres whose density individually varies from 0.4 to 0.6 gram per cubic centimeter.

2. The concrete material as claimed in claim 1, wherein said cement in said admixture varies from .2 to 4.0 parts for each part cenospheres, by volume.

3. The concrete material as claimed in claim 1, wherein said hydraulic cement comprises portland cement.

4. The concrete material as claimed in claim 1, wherein said hydraulic cement comprises a high-alumina cement.

5. The concrete material as claimed in claim 2, wherein said hydraulic cement comprises portland cement.

6. The concrete material as claimed in claim 2, wherein said hydraulic cement comprises a high-alumina cement.

7. A method of producing an improved, lightweight, high strength concrete product comprising the steps of:
(1) mixing fly ash cenospheres whose individual density varies from 0.4 to 0.6 gram per cubic centimeter as the sole aggregate with dry hydraulic cement to the extent necessary to prevent stratification of the liquid cenospheres in the heavier cement,
(2) adding sufficient water and mixing the same with the admixture of cement and fly ash cenospheres to achieve workability of the resulting fluid mixture, and
(3) casting the resulting fluid mixture into the product form desired and hardening the same.

8. The method as claimed in claim 7, wherein the ratio by volume of cement to cenospheres varies from .2 to 4.0.

9. The method as claimed in claim 7, wherein the ratio by volume of the water to cement varies from .36 to 1.5.

10. The method as claimed in claim 8, wherein the ratio by volume of the water to cement varies from .36 to 1.5.

References Cited

UNITED STATES PATENTS

| | | | |
|---|---|---|---|
| 2,527,766 | 10/1950 | Rule | 106—97 |
| 2,880,100 | 3/1959 | Ulfstedt | 106—89 |
| 2,987,406 | 6/1961 | Minnick | 106—Dig. 1 |
| 2,987,407 | 6/1961 | Ulfstedt et al. | 106—97 |
| 2,987,408 | 6/1961 | Minnick | 106—Dig. 1 |
| 3,328,180 | 6/1967 | Ban | 106—97 |
| 3,669,701 | 6/1972 | Biederman, Jr. | 106—120 |

OTHER REFERENCES

Minnick, L. J.: "Brick and Clay Record," pp. 78–81, 102, 103, 105 (April 1965).

Bureau of Mines Information Circular #8483, "Fly Ash Utilization," p. 16 (1970).

Taylor, H. F. W.: The Chemistry of Cements, 1964, p. 15.

DELBERT E. GANTZ, Primary Examiner

S. L. BERGER, Assistant Examiner

U.S. Cl. X.R.

106—98, 104, Dig. 1